United States Patent [19]

Tidwell

[11] Patent Number: 4,561,383
[45] Date of Patent: Dec. 31, 1985

[54] BIRDHOUSE WITH CYLINDRICAL COMPARTMENTS

[76] Inventor: Doyle A. Tidwell, 621 Cedar La., Fort Smith, Ark. 72903

[21] Appl. No.: 639,010

[22] Filed: Aug. 9, 1984

[51] Int. Cl.[4] .............................................. A01K 31/00
[52] U.S. Cl. ...................................................... 119/23
[58] Field of Search .......................................... 119/23

[56] References Cited

U.S. PATENT DOCUMENTS

| | | | |
|---|---|---|---|
| 3,108,570 | 10/1963 | Kerkhove | 119/23 |
| 3,177,849 | 4/1965 | Isenberg | 119/23 |
| 3,478,722 | 11/1969 | Falcone et al. | 119/23 |
| 4,173,200 | 11/1979 | Olsen et al. | 119/23 |
| 4,242,983 | 1/1981 | Moore | 119/23 |

*Primary Examiner*—Hugh R. Chamblee
*Attorney, Agent, or Firm*—Robert R. Keegan

[57] ABSTRACT

There is disclosed a multiple compartment birdhouse where the compartments are within three rigid white plastic cylinders with the end walls of the compartments being formed by resiliently deformable white plastic sheet material having an entrance opening cut centrally therein and removably secured about three inches from the edge of said cylinder by having its top and bottom edges captured in notches in the edges of elongated strips of semirigid plastic material running most of the length of the cylinder; the bottom such strip acts as a slightly raised floor in the compartment and is provided with holes to facilitate drainage and ventilation; each tube has two compartments and there is a double partition in the center of each tube formed of the same material and of generally the same shape as the end walls. The tubes are secured in a triangular array in mutual peripheral contact and metal fixtures are secured to the base of the triangle for mounting the array atop a conventional birdhouse pole. Horizontal perches are secured in front of the compartment's openings and along the sides and top of the array of cylinders.

7 Claims, 6 Drawing Figures

BIRDHOUSE WITH CYLINDRICAL COMPARTMENTS

The present invention relates to birdhouses and particularly to multiplex or apartment type houses suitable for purple martins. Houses for purple martins have been formed in various shapes but most commonly consist of a large enclosure with multiple compartments of rectangular cross section having individual openings. Generally, there are several compartments on each level and a plurality of levels. There are usually about twelve compartments but the number may be considerably more or somewhat less. The house is normally mounted on a pole at a height of 15-20 feet. Many variations of this arrangement have been employed in which the horizontal cross section of the overall enclosure was hexagonal, octagonal or the like, and in some cases a center opening is provided to accomodate the mounting pole and permit the house itself to be raised up and down a fixed pole by means of a rope and pulley. In other cases a portion of the pole is pivoted so that the house may be lowered to give access to the house from ground level.

Birdhouses according to the present invention depart from prior conventional arrangements in that the compartments forming the individual houses are of circular vertical cross section and may be formed of rigid plastic pipe material. A typical martin house according to the invention would include three or six plastic tube sections each having oppositely facing individual compartments and secured together with one tube, two tubes, and three tubes on the top, second, and (if present) third level respectively. The walls and partitions in the houses are arranged to snap in and out so that the houses may readily be cleaned out by removing the walls and partitions and pushing out nesting debris or the like. This is an important consideration because it is frequently necessary to avoid nesting by unwanted birds such as sparrows. The array of white smooth cylindrical birdhouse compartments presents a pleasing appearance and is attractive to the martin scouts which select nesting places.

By setting the end wall of the compartments back from the edge of the cylinder a porch is provided for the birdhouses, and a horizontal roosting rail extending across the front of the porch provides a perch for the birds to alight on; it also acts as a guard rail to help prevent baby birds from falling to the ground. Brackets on the bottom of the array are used to secure it to the top of a steel or wood pole of customary type.

Single birdhouses in the shape of a cylinder have been known and were primarily the result of adapting containers for food or other products to have a secondary use of being converted into a birdhouse. Examples of such individual birdhouses of cylindrical form are shown in the following United States Patents.

| U.S. Pat. No. | Title | Inventor | Date |
| --- | --- | --- | --- |
| 4,242,983 | Bird Nesting Box Formed Of A Disposable Storage Container | Michael R. P. Moore | Jan. 6, 1981 |
| 4,166,432 | Method For Converting A Disposable Storage Container To A Bird Nesting Box And Articles Of Manufacture Associated Therewith | Michael R. P. Moore | Sep. 4, 1979 |
| 4,239,021 | Disposable Storage Container Convertible To A Bird-Nesting Box | Michael R. P. Moore | Dec. 16, 1980 |
| 4,173,200 | Birdhouse Construction | Wayne A. Olsen | Nov. 6, 1979 |
| 3,916,836 | Method And Apparatus For Erecting Or Building And Housing Or Containing Small Animals Or Birds | Fritz Justl | Nov. 4, 1975 |

It will be noted that the prior cylindrical birdhouses were not adapted to be arranged in triangular arrays, did not have readily removable walls, nor were they provided with porches and perching rails as in the present invention.

In addition to providing the above described features and advantages it is an object of the present invention to provide a multiplex birdhouse wherein each individual compartment is in the form of a cylinder and the cylinders are secured in contact in an ordered array.

It is another object of the present invention to provide such birdhouses in which the compartments are formed of white plastic pipe and having a compartment in each end of each piece of pipe.

It is still another object of the present invention to provide such multiplex birdhouses wherein the walls and partitions in the cylinders are readily removable.

It is yet another object of the present invention to provide a birdhouse with a cylindrical compartment wherein the front wall is recessed by at least one inch from the edge of the cylinder thereby providing a roofed porch on the birdhouse.

And it is another object of the present invention to provide such a porched birdhouse with a perch rail near the front edge of the cylinder serving both as a perch and a rail to help prevent baby birds falling from the birdhouses.

Other objects and advantages of the present invention will be apparent by consideration of the following description in conjunction with the appended drawings in which FIG. 1 is an isometric view of a six compartment birdhouse according to the present invention;

Figure 1:
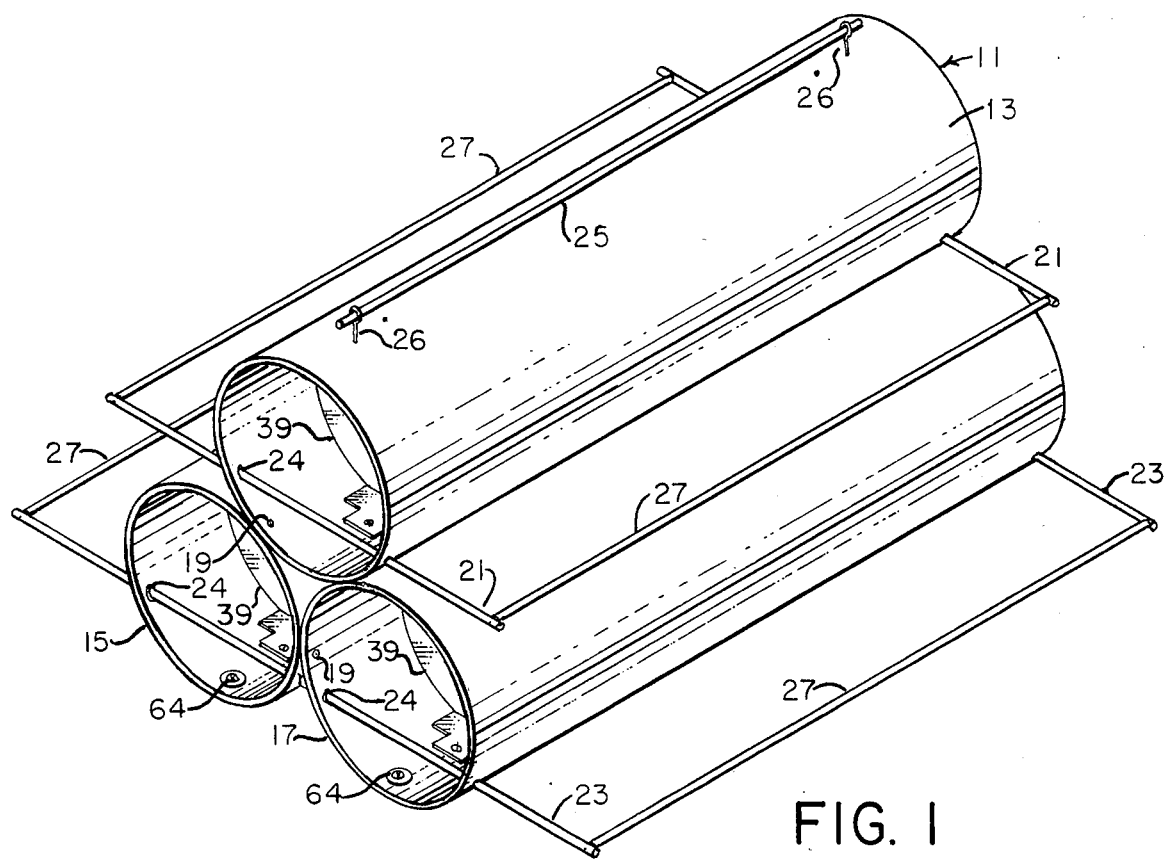
Figure 2:
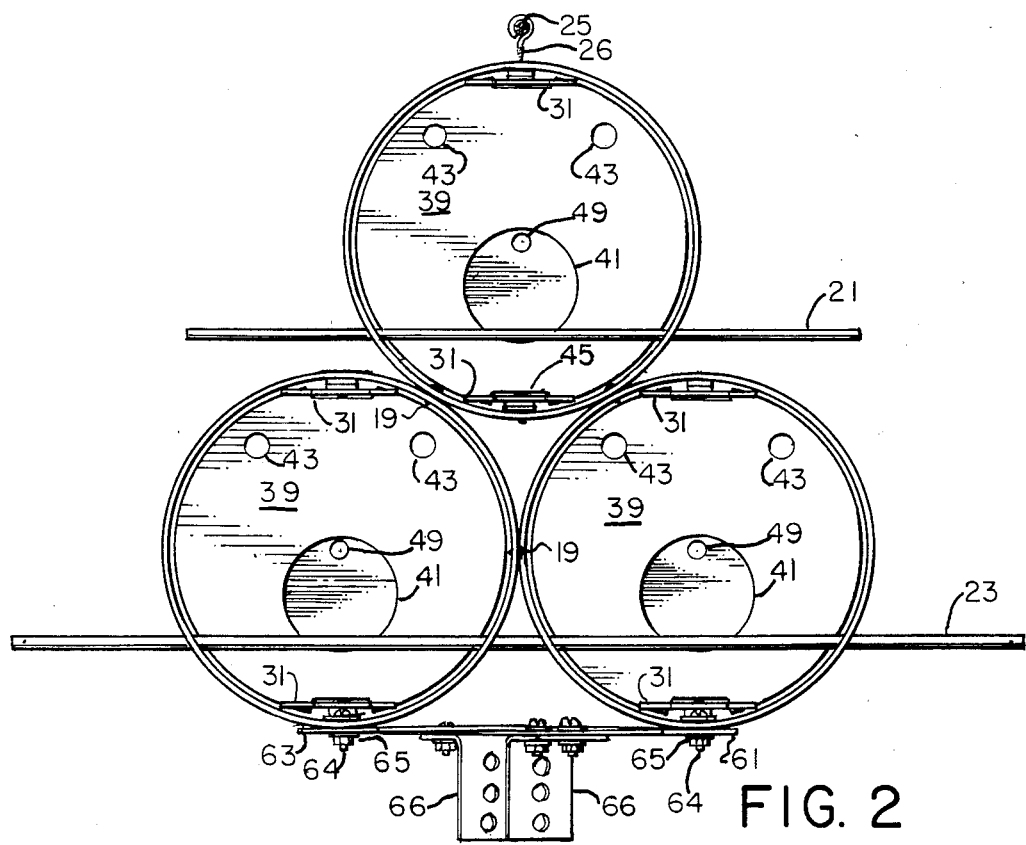
FIG. 2 is a front elevation thereof.
Figure 3:
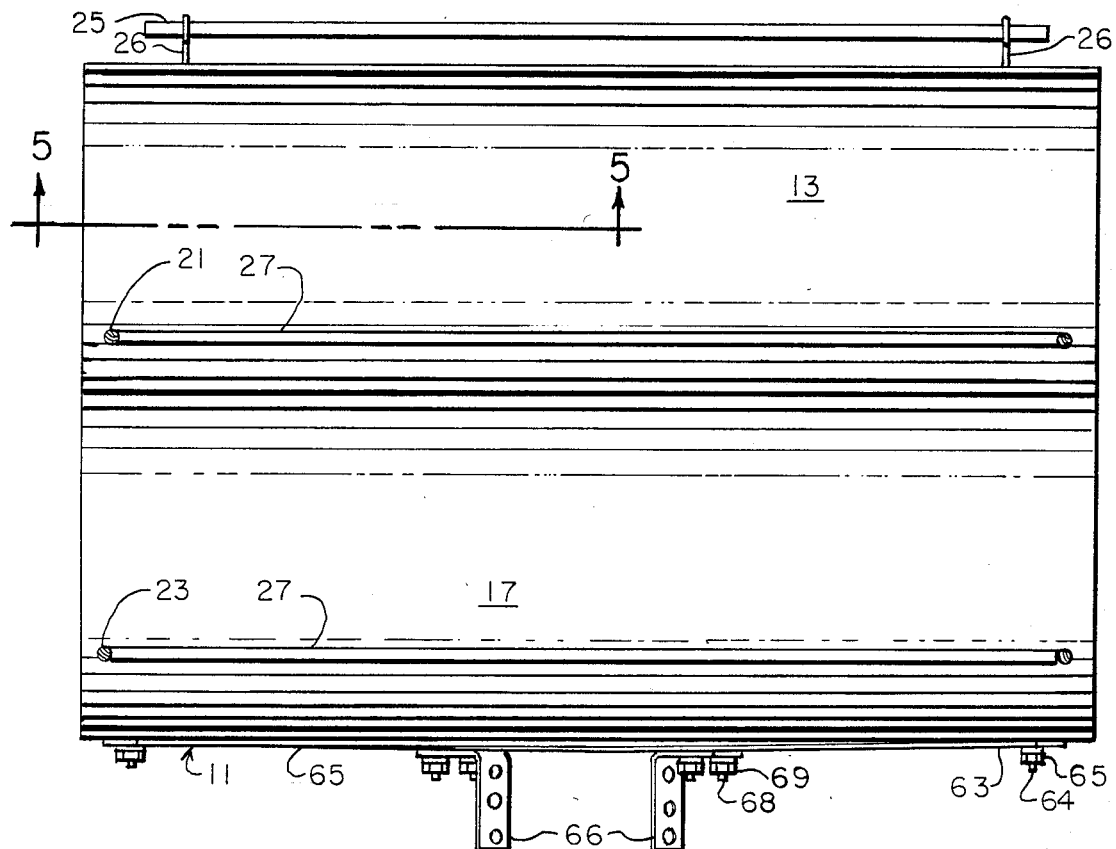
FIG. 3 is a side elevation thereof.

Referring now to the drawings and particularly FIGS. 1 and 2 and apartment style birdhouse 11 is shown particularly suited for purple martins which is principally composed of three tube or pipe sections 13, 15, and 17 secured in a triangular configuration by fasteners such as rivets 19. Sections 13, 15, and 17 are formed of rigid plastic pipe of six inch diameter which, for purple martin house, is preferably white in color. Perch rails 21, 23 are provided at the ends of the houses and may be formed of cylindrical dowels of wood or plastic of about ¼ inch diameter; they may be black to contrast with sections 13, 15, and 17. In the illustrated embodiment rails 21 and 23 are installed in holes 24 appropriately placed near the ends of tube sections 13, 15, and 17. The direction and size of holes 24 is preferably such that rails 21 and 23 are force fits, but alternatively pins, clips or notches on rails 21 and 23 may be used to constrain the rails from sliding in the holes 24.

Preferably the rails 21 and 23 extend substantially beyond the edges of sections 13, 15, and 17 to provide ample perching places for the occupants of the birdhouse. In addition, a perch rail 25 is secured atop pipe section 13 by screw eyes 26 and side rails 27 are secured between the ends of perch rails 21 and 23. Side rails 27 are preferably provided with pins or nails in the ends which engage holes in the sides of rails 21 and 23 (neither of which is shown in the drawings). Other means well known in the mechanical arts may be provided for securing perch rails 21, 23, and 25 or side rails 27. Rails 25 and 27 are optional and may be omitted if desired.

The perch rails 21 and 23 serve several functions. First, they provide a perch at the side of the houses where the birds may perch and have a wide view of the surrounding territory. They also provide a perch for alighting near the opening preparatory to entering the house. Also they provide a guard rail at the front of the house to assist birds in preventing their young from falling to the ground.

Figure 5:
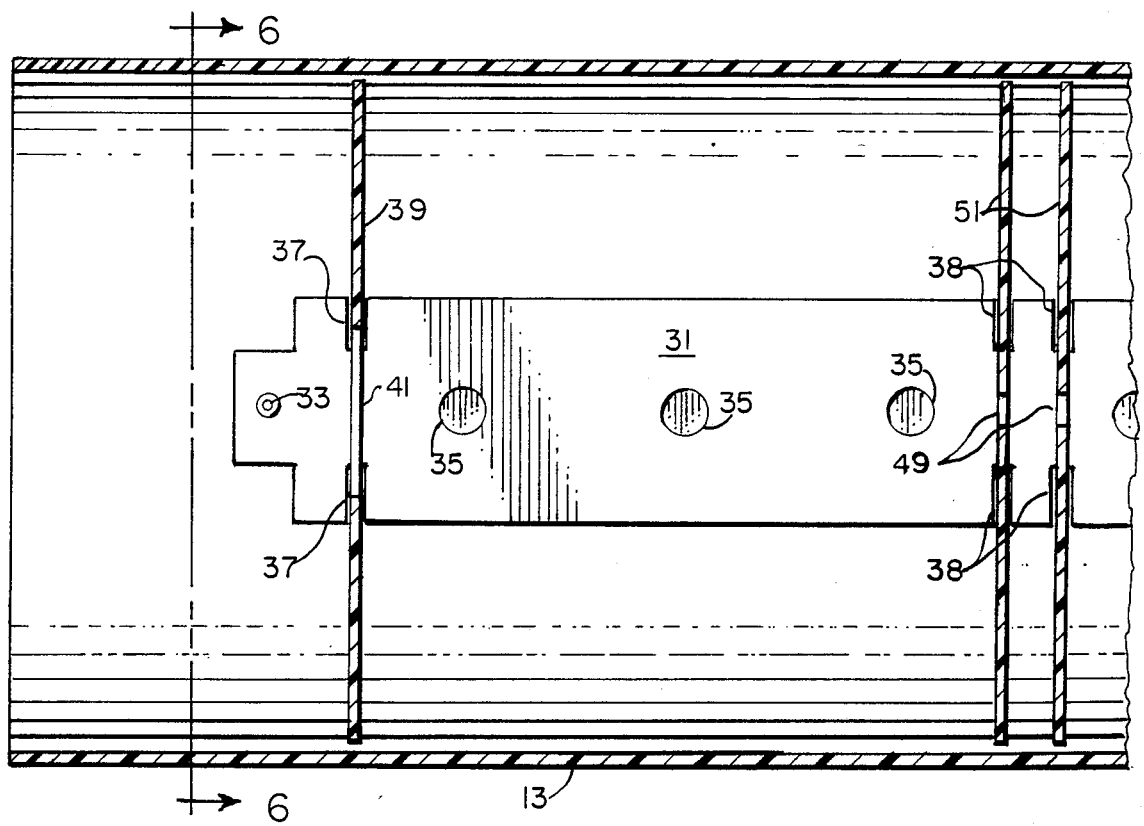
FIG. 5 is an enlarged fragmentary horizontal sectional view taken along the line 5—5 in FIG. 3.

As best seen in FIG. 5 an elongated plastic sheet panel 31 is secured by rivets 33 in both the floor and the ceiling of the compartments formed by pipes 13, 15, and 17. The panels 31 form ducts which assist in ventilation of the houses and those in the floor of the house provide a dry floor in case of entrance of rain or moisture in very adverse weather conditions. This is accomplished because the cylindrical shape of the house causes any rain or other moisture to run down the walls to the bottom of the cylinder and eventually out one or the other end of the cylinder. As will later be described the house entrances are protected by overhangs from the elements so that great quantities of rainwater will not enter the house and thus the panels 31 will be sufficiently raised from the bottom of the cylinder to maintain a dry floor.

The panels also form ducts running through the length of the sections 13, 15, and 17 and through two compartments of each section thereby providing cross ventilation. Openings 35 in panels 31 aid in such ventilation and also complete the assurance that moisture will be drained from the house through the duct under the lower panels 31.

It will be noted that each one of the sections 13, 15, and 17 together with all of its components are identical thus allowing the apartment house to be made in modular form with identical modules. Thus the apartment house can be readily enlarged from the triangular array illustrated as a preferred embodiment by adding additional pipe sections such as 13, 15, and 17. For example, three additional such sections could be added at the bottom to form the lower row of compartments in a twelve apartment house. Another arrangement might have one tube section surrounded by six other pipe sections in a hexagonal array to form a fourteen compartment house. Alternatively the sections could be stacked criss cross in cordwood fashion with two or more sections per level. Larger or smaller houses could be formed in a similar manner in almost unlimited variation. Although the double ended arrangement shown in preferred, sections 13, 15, and 17 could be only half as long and provide only one compartment each.

The panels 31 are preferably formed of white plastic sheet approximately 1/16 inch in thickness; they are provided with slots 37 near the end and slots 38 near the center as best shown in FIG. 5; these serve as retaining means for circular plastic end walls 39 and for circular plastic partitions 51. End walls 39 and partitions 51 are formed of white semi-rigid plastic which is sufficiently flexible to be snapped into place readily with indentations 45 straddling panel 31 and the edges of such indentations engaging slots 37. Partitions 51 are of similar shape and engaged in slots 38 in a similar manner.

End walls 39 may be removed by a firm pull using the edge of entrance opening 41 as a fingerhold. Partitions 51 may also be removed by a firm pull and holes 53 are provided to engage partitions 51 with a tool such as a ⅜ inch lag bolt or a stiff wire hook.

In addition to the central opening 41 for ingress and egress of the occupants of the birdhouse two optional smaller openings 43 are provided in each end wall 39 for better ventilation. The openings 43 are near the top edge of the cylinder to substantially eliminate entry of rain through openings 43. Central openings 41 may be slightly below center for better access as shown in FIG. 2. The location and number of ventilation openings in the birdhouse is obviously subject to great variation; additional openings could be provided in the bottom of the cylindrical sections 13, 15, and 17 if desired. Spacers 34 in the form of plastic or metal washers may be utilized to assure that the panels 30 are uniformly located and spaced from the cylinder wall when riveted by rivets 33.

It should be noted that two partition elements 51 are provided in the preferred embodiment illustrated. This serves to give better separation in terms of sound insulation and "privacy" between the two compartments in one pipe section. There is ample sound insulation and separation between adjacent pipe sections. The double partition also has another purpose; before the birdhouse is occupied with martins it is frequently necessary to remove the nesting materials of other birds to discourage them from occupying the birdhouse which would prevent martins from taking up abode in them. The snap out partitions 51 and end walls 39 make it very simple to gain access to one or all of the birdhouse compartments to remove nesting material of unwanted species or to clean out the houses in preparation for another season. In some cases, however, the houses of a partially occupied purple martin apartment may be occupied by unwanted species and it has been found possible to lower the birdhouse, open up the compartment of the unwanted species and remove its nesting material and return the house to elevated position without causing the martins to be noticeably disturbed. Of course, this would be done before the martin nest is occupied with eggs or baby birds. In such a case the ability to remove the end wall 39 and one partition 51 together with any nesting material in that compartment is very useful since it allows the other partition 51 to remain in place and avoids disturbing a martin nest which may be in the adjacent compartment.

Figure 4:
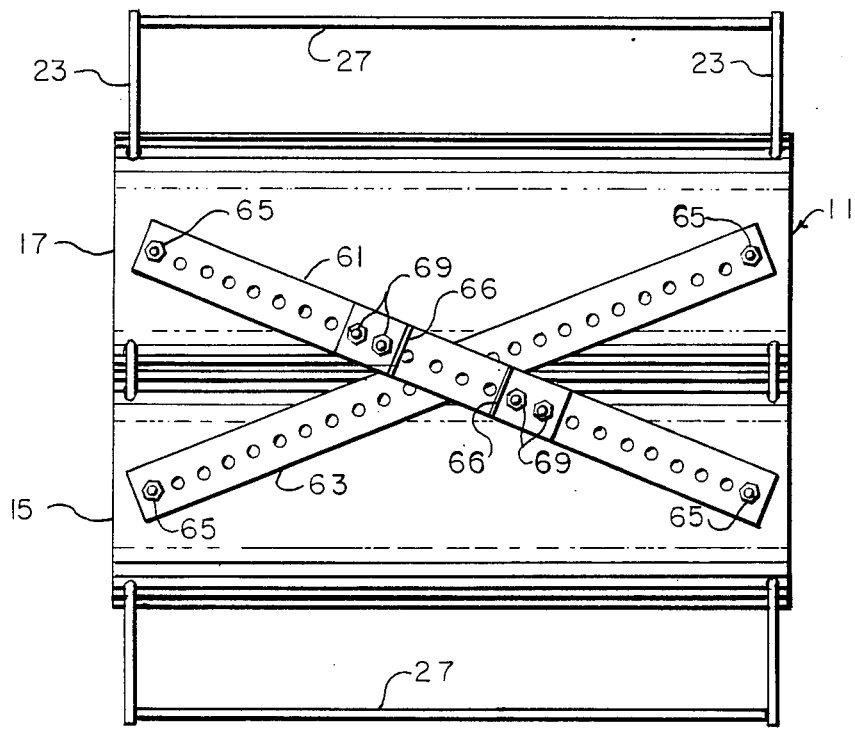
FIG. 4 is a bottom plan view thereof.
Figure 6:
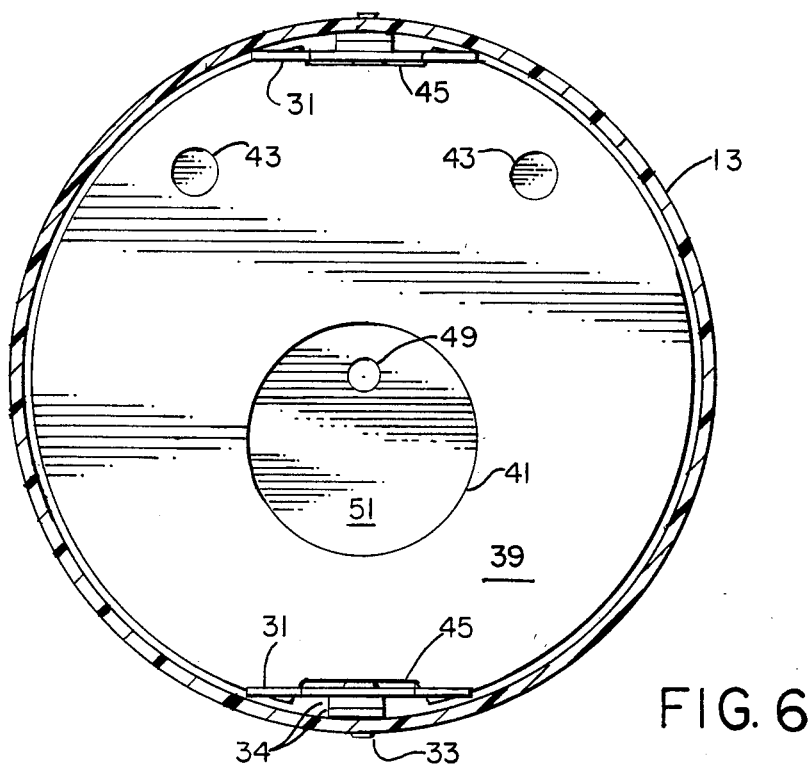
FIG. 6 is an enlarged vertical sectional view taken along the line 6—6 in FIG. 5.

The birdhouse 11 may be mounted on a pole of appropriate height to attract martins by any conventional mounting hardware. For example, a pair of metal straps 61 and 63 are provided in the illustrated embodiment which are secured to the bottoms of sections 15 and 17 by bolts 64 and nuts 65. Strap 61 and 63 are conventional steel straps approximately 1/16 inch thick with perforations for variable bolt placement. As shown in FIG. 4 the strap 63 and 61 provide a means for securing the birdhouse atop a pole and at the same time more firmly secure together pipe sections 15 and 17. Brackets 66 of L-shape are secured to strap 61 by bolts 69 and provide means for bolting or screwing the birdhouse assembly to the top of a wood or metal pole (not shown). The pole may be permanently implaced or, more commonly, is arranged so that a portion of the pole may be lowered to place the birdhouse within convenient reach of the ground for cleaning, removal, or replacement.

Birdhouses according to the invention have been found to have many attributes desirable to attract purple martins including the white color, the shape and proportions of the compartments and their arrangement into an apartment complex. Other features such as the perch rails and side rails, the ventilation, and the drainage provisions seem to be attractive to the desired purple martin occupants. The white plastic pipe sections and the white plastic end walls and partitions are not only attractive to the desired occupants, but also are a low maintenance and durable material. Furthermore the end walls and partitions are readily replaceable as are the perch rails and side rails. It is contemplated that the birdhouse would be most conveniently shipped with the perch rails and side rails not installed. These accessories may be placed within one of the pipe sections along with the partitions 51 and the end wall elements 39 together with the mounting straps 61 and 63 and brackets 69 and other hardware. This provides a strong compact unit needing only simple packaging for protection against damage in shipment.

Another convenient feature of the invention is the interchangability of the partitions 51 and the end walls 39. In the off season for purple martins the partitions 51 may be put in place of the end walls 39 sealing off the unit and preventing nesting of unwanted species.

While the birdhouse invention has been described with particular reference to attracting the highly desirable purple martin species, it will be readily apparent that other species could be attracted if desired by changing the color of one or more components and/or entry opening size (which is about two inches for martins) to attract some other desired species. The features of the birdhouse making it readily possible to remove nesting materials of undesired species would still be of great utility.

In addition to the variations and modifications to the invention which have been described or suggested above, other variations or modifications will be readily apparent to those skilled in the art and accordingly the scope of the invention is not to be considered limited to the particular embodiments shown, described, or suggested but is rather to be determined by reference to the appended claims.

What is claimed is:

1. A multiple compartment bird house comprising
    at least three cylindrical tubes from 4 to 8 inches in diameter at least 6 inches long,
    means for connecting said tubes in a fixed array with at least two of said tubes in mutual peripheral contact,
    a plurality of wall elements of generally circular shape, at least some of said wall elements having a hole therein serving as an entrance opening,
    fastening means for removably fastening said wall elements in said tubes spaced within 3 inches of the end thereof, and
    horizontal perch rails secured near at least some of the ends of said tubes.

2. Apparatus as recited in claim 1 wherein said tubes are formed of white rigid plastic in the shape of a solid walled right circular cylinder.

3. Apparatus as recited in claim 1 wherein said wall elements are flat white plastic sheets of circular shape fitting closely inside said tubes.

4. Apparatus as recited in claim 1 wherein each said perch rail is a dowel placed to pass through openings in one of said tubes near one end thereof so that said dowel is transverse to the axis of said cylindrical tube.

5. Apparatus as recited in claim 1 further including perch rails secured parallel to the axes of said cylindrical tubes.

6. Apparatus as recited in claim 1 wherein said fastening means include elongated flat sheets of plastic secured lengthwise in said cylindrical tubes.

7. Apparatus as recited in claim 6 wherein said wall elements are resiliently deformable and said sheets have notches to receive the edges of said elements.

* * * * *